United States Patent [19]

Covey et al.

[11] Patent Number: 4,471,931
[45] Date of Patent: Sep. 18, 1984

[54] CRT MONITOR TILT MECHANISM

[75] Inventors: Donald H. Covey, Deerfield; Kenneth F. Lewinski, Hoffman Estates, both of Ill.

[73] Assignee: Teletype Corporation, Skokie, Ill.

[21] Appl. No.: 476,891

[22] Filed: Mar. 18, 1983

[51] Int. Cl.³ .............................................. A47G 29/00
[52] U.S. Cl. ...................................... 248/125; 108/6; 248/122; 248/133; 248/371; 312/7.2; 362/269
[58] Field of Search ............... 248/125, 132, 133, 149, 248/371, 394, 395, 157, 161, 162.1, 123.1, 179, 122, 291, 292.1, 286; 312/7.2, 120; 108/6, 9; 403/92; 362/269, 371, 372

[56] References Cited
U.S. PATENT DOCUMENTS

| | | | |
|---|---|---|---|
| 1,687,821 | 10/1928 | Aldeen | 362/371 |
| 2,161,367 | 6/1939 | McGregor et al. | 248/395 |
| 2,528,973 | 11/1950 | Radman | 250/141 |
| 3,026,079 | 3/1962 | Stack | 248/125 |
| 3,784,135 | 1/1974 | Owen | 108/6 |
| 3,789,140 | 1/1974 | McQueen et al. | 178/7.81 |
| 4,350,098 | 9/1982 | Shirono et al. | 108/6 |
| 4,354,654 | 10/1982 | Werner et al. | 248/371 |
| 4,365,779 | 12/1982 | Bates et al. | 248/179 |
| 4,368,867 | 1/1983 | Pendleton et al. | 248/346 |
| 4,395,010 | 7/1983 | Helgeland et al. | 248/123.1 |

Primary Examiner—William H. Schultz
Assistant Examiner—Ramon O. Ramirez
Attorney, Agent, or Firm—A. A. Tirva

[57] ABSTRACT

A mechanism for tilting a display screen of a CRT includes a detent gear rack molded in the side of an arch supporting therein a pivotably mounted cabinet housing the CRT. A molded detent lever is slidably attached to a side of the cabinet and is arranged to normally be in engagement with the detent gear rack.

8 Claims, 4 Drawing Figures

CRT MONITOR TILT MECHANISM

DESCRIPTION

1. Technical Field

This invention relates to a display screen of a cathode ray tube and to means for adjusting the angle of viewing of such a screen.

2. Background Art

Use of cathode ray tubes (CRTs) in connection with business machines for production of displays on their display screens in response to operator-controlled keyboards has become commonplace. Time loss resulting from error correction in production of printed machine output has been minimized by such use. However, variation in operator height, or in ambient conditions of tube use can result in glare from the display screen, thereby reducing operator efficiency. To prevent or minimize glare, a display screen should be tiltable for changing the angularity or pitch of viewing the screen.

Until now, a number of various mechanisms have been developed for tilting display screens of CRTs. One of these comprises a rockable platform on which a CRT is mounted within a cabinet. Another mechanism includes a yoke-shaped bracket which is driven linearly in response to manual rotation of a knob, the bracket being coupled to a CRT relatively remote from its display screen. Yet another mechanism comprises a driven worm gear meshed with a gear secured to a shaft which in turn is fastened to the neck of a CRT.

Each of the heretofore known mechanisms, while efficient for changing tube angularity or pitch, is relatively expensive, because each requires two or more parts some of which require accurate machining; and additionally, usually most parts are located within a cabinet enclosing the CRT and associated electronics making the assembly difficult and time-consuming.

DISCLOSURE OF THE INVENTION

In accordance with the present invention, we provide a mechanism for tilting a display screen of a CRT wherein the CRT is disposed within a cabinet which is pivotably mounted in a support arch. A detent gear rack having a plurality of teeth is located in the support arch; and a detent lever having one end shaped as a pinion adapted to mesh with the gear rack is slidably attached to the cabinet. The tilt mechanism includes means for keeping the pinion tooth in engagement with the gear rack.

THE DRAWING

DETAILED DESCRIPTION

Figure 1:
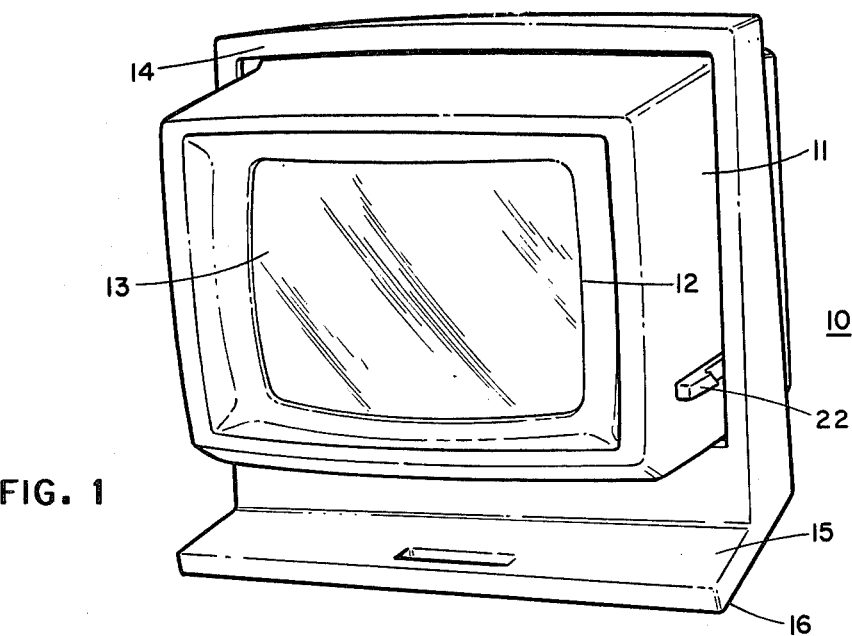
FIG. 1 is a perspective view of a display screen disposed within a cabinet which is pivotably mounted in a support arch.

FIG. 1 shows a perspective view of a CRT monitor assembly 10 comprising a cabinet 11 with an opening 12 and having a CRT (not shown) disposed within the cabinet 11. The CRT is positioned within the cabinet 11 so that the CRT's image display screen 13 is visible through the cabinet opening 12. The cabinet 11, which may be molded from a thermal setting type of plastic material, is pivotably mounted in a support arch 14 having a pedestal 15 with a substantially flat bottom surface 16 for positioning the CRT monitor assembly 10 on a flat surface such as a top of a desk. The support arch 14 and the pedestal 15 may be molded as a unitary body from a thermal setting type of plastic material.

Figure 2:
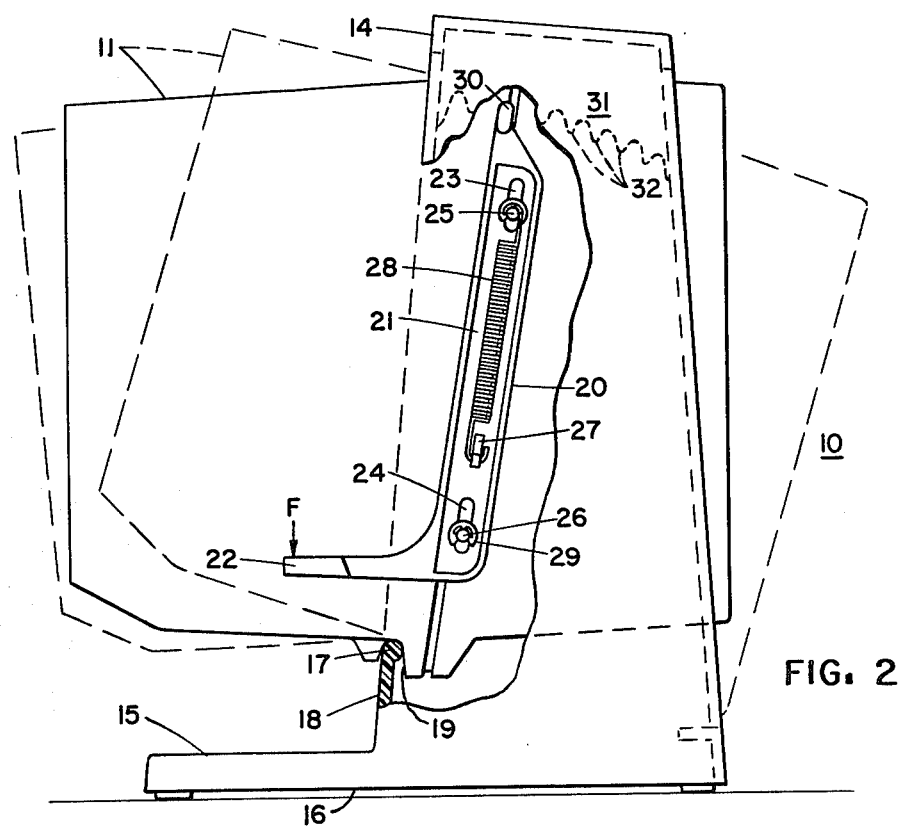
FIG. 2 is a view partially in vertical section and partially in side elevation of a cabinet and of a tilt mechanism embodying one form of the invention herein, a part of the support arch being broken out for the purpose of illustration.

FIG. 2 shows a partial side elevation of the CRT monitor assembly 10 with a portion of the support arch 14 cut away to illustrate one of the embodiments of the monitor tilt mechanism in accordance with the present invention.

The cabinet 11 is pivotably mounted in a support arch 14 in the following manner. The cabinet 11 has a substantially U-shaped groove 17 located in its bottom surface and extending the width of the cabinet 11. The groove 17 is positioned so that the weight of the cabinet 11, enclosing the CRT and associated electronics (not shown), is distributed substantially equally between the two portions of cabinet 11 separated by the groove 17.

The groove 17 is adapted to mate with a projection 18 extending upward from the pedestal 15, in a direction close to the perpendicular to the bottom surface 16 of the pedestal 15, and across the width of the pedestal 15. Projection 18 terminates in a substantially cylindrical surface 19 which fits into the groove 17. Sufficient clearance is provided between the cylindrical surface 19 and groove 17 allowing the cabinet 11 to pivot on the cylindrical surface 19 using it as a bearing surface. Sufficient clearance is provided between the cabinet 11 and the support arch 14 to permit tilting of the cabinet 11 to the extreme two positions indicated by the dotted lines in FIG. 2.

Figure 3:
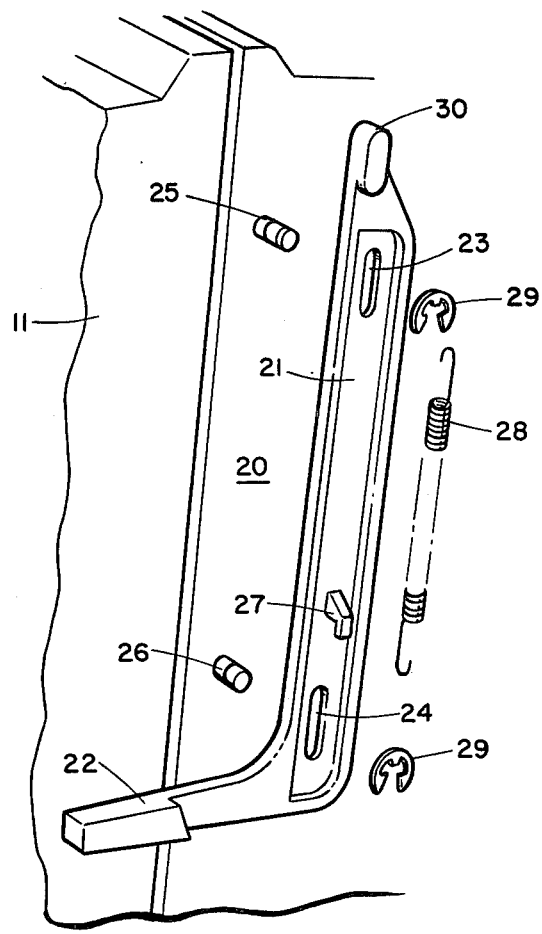
FIG. 3 is a detail view of a portion of the side elevation shown in FIG. 2.

FIG. 3 shows a substantially L-shaped detent lever 20 composed of a long section 21 and a short section 22. A pair of elongated openings 23 and 24 are located in the long section 21. The openings 23 and 24 are positioned to accept mounting posts 25 and 26, respectively, extending from a side of the cabinet 11. The openings 23 and 24 have elongated shapes to permit a predetermined amount of sliding movement of the detent lever 20 along an imaginary line extending through the centers of the two mounting posts 25 and 26. The posts 25 and 26 are located on a portion of a cabinet 11 which is within the support arch 14 when the cabinet 11 is mounted in the support arch 14. When the detent lever 20 is slidably mounted on the mounting posts 25 and 26, the short portion 22 extends along the side of the cabinet 11 outside of the arch 14 towards the opening 12 in the cabinet and lies substantially parallel to the bottom surface 16 of the pedestal 15.

The detent lever 20 has a hook 27 located on portion 21 near the elongated opening 24. An extension spring 28 has one end attached to mounting post 25 and the other end attached to the hook 27. The spring 28 develops a sufficient force to keep the detent lever 20 in its uppermost position. A pair of retaining rings 29 are used to retain the detent lever 20 on the mounting posts 25 and 26. The detent lever 20 may also be molded from a thermal setting type of plastic material.

The end of the detent lever 20 opposite the L-shaped end is shaped in a form of a pinion tooth 30 and is adapted to mesh with a gear rack 31 having a plurality of teeth 32 which are molded in a side of the support arch 14. Spring 28, by forcing to and maintaining detent lever 20 in its uppermost position, keeps the pinion tooth 30 in engagement with gear rack 31, thus preventing the cabinet 11 from pivoting around the cylindrical surface 19. To tilt the cabinet 11, a downward force F, of sufficient magnitude to overcome the force developed by spring 28, is applied to the short section 22 of the detent lever 20. This action disengages the pinion tooth 30 from the gear rack 31 permitting the cabinet 11 to be pivoted between the two extreme positions shown by dotted lines in FIG. 2.

Figure 4:
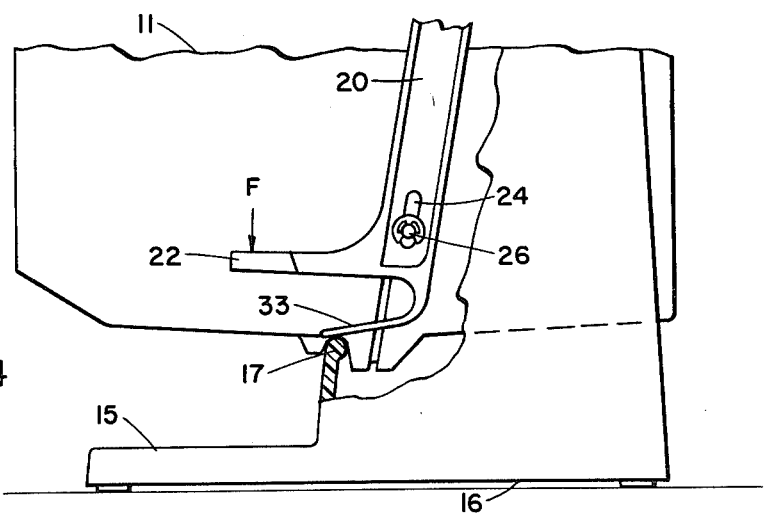
FIG. 4 is a detail view of an alternate embodiment of the invention.

In FIG. 4, there is shown an alternate embodiment of the invention wherein the spring 28 is replaced by a resilient tab 33 which is molded as part of the detent lever 20. The resilient tab 33 performs the same function as the spring 28; namely, it develops a sufficient force to keep the detent lever 20 in its uppermost position and the pinion tooth 30 engaged with the gear rack 31. Additionally, resilient tab 33 has sufficient give to permit disengagement of the pinion tooth 30 from the gear rack 31 when a downward force F is applied to the section 22 of the detent lever 20.

What is claimed is:

1. A mechanism for tilting a display screen of a CRT disposed within a cabinet, the mechanism comprising:
   a support arch mounted on a pedestal;
   means for pivotably mounting said cabinet in said support arch;
   a detent gear rack having a plurality of teeth located on said support arch;
   a detent lever slidably attached to said cabinet, said lever having one end shaped as a pinion tooth adapted to mesh with said gear rack; and
   means for keeping said pinion tooth in engagement with said gear rack whereby said cabinet is prevented from pivoting.

2. A mechanism in accordance with claim 1, wherein means for pivotably mounting said cabinet comprises:
   a projection extending upward from said pedestal and substantially across the width of said pedestal, said projection terminating in a substantially cylindrical surface; and
   said cabinet having a substantially U-shaped groove located on the bottom surface of said cabinet and extending substantially the width of said cabinet, said groove adapted to receive said cylindrical surface.

3. A mechanism in accordance with claim 2 wherein said support arch and pedestal are molded from a thermal setting type of plastic material.

4. A mechanism in accordance with claim 3 wherein said gear rack is molded in said support arch.

5. A mechanism in accordance with claim 4 wherein means for keeping said pinion tooth in engagement with said gear rack comprises an extension spring.

6. A mechanism in accordance with claim 1 wherein said detent lever is molded from a thermal setting type of plastic material, and the end opposite the end shaped as a pinion tooth is substantially L-shaped.

7. A mechanism in accordance with claim 1, further comprising means for disengaging said pinion tooth from said gear rack.

8. A mechanism in accordance with claim 6 wherein means for keeping said pinion tooth in engagement with said gear rack comprises a resilient cantilever tab projecting from the end of said detent lever opposite the end shaped as a pinion tooth.

* * * * *